United States Patent
Durfee et al.

(10) Patent No.: US 7,725,928 B2
(45) Date of Patent: May 25, 2010

(54) SYSTEM AND METHOD FOR ESTABLISHING TEMPORARY AND PERMANENT CREDENTIALS FOR SECURE ONLINE COMMERCE

(75) Inventors: Glenn E. Durfee, San Francisco, CA (US); Dirk Balfanz, Redwood City, CA (US); Diana K. Smetters, Belmont, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 1208 days.

(21) Appl. No.: 11/293,402

(22) Filed: Dec. 2, 2005

(65) Prior Publication Data
US 2007/0130617 A1   Jun. 7, 2007

(51) Int. Cl.
*H04L 9/00* (2006.01)
(52) U.S. Cl. ............... 726/5; 726/17; 726/18; 726/19; 726/20; 713/156; 380/282
(58) Field of Classification Search ............ 713/156; 726/5, 17–20; 705/65, 76; 380/282
See application file for complete search history.

(56) References Cited

U.S. PATENT DOCUMENTS

2005/0083846 A1* 4/2005 Bahl ............... 370/236
2005/0138364 A1* 6/2005 Roskind et al. ............. 713/156
2006/0047971 A1* 3/2006 Miyazaki et al. ........... 713/186
2008/0127320 A1* 5/2008 De Lutiis et al. .............. 726/9

FOREIGN PATENT DOCUMENTS

JP       2005-353075       * 12/2005
JP       2005-353705       * 12/2005
WO    WO 2006/129251 A2  * 12/2006

OTHER PUBLICATIONS

Liu et al., "Multi-Application Smart card with Elliptic Curve Cryptosystem Certificate", 2001 IEEE, pp. 381-384.*

* cited by examiner

*Primary Examiner*—Kambiz Zand
*Assistant Examiner*—Tongoc Tran
(74) *Attorney, Agent, or Firm*—Park, Vaughan & Fleming LLP; Shun Yao

(57) ABSTRACT

One embodiment of the present invention provides a system for establishing temporary and permanent credentials for secure remote data access. The system includes a temporary smart card configured to provide a temporary credential for a first device, thereby providing the first device with temporary secure access to a remote data source when the temporary smart card is used with the first device. Additionally, the system includes an enrollment smart card configured to provide a permanent credential for a second device, thereby providing the second device with permanent secure access to the remote data source without presence of the enrollment smart card or the temporary smart card.

23 Claims, 9 Drawing Sheets

SYSTEM AND METHOD FOR ESTABLISHING TEMPORARY AND PERMANENT CREDENTIALS FOR SECURE ONLINE COMMERCE

BACKGROUND

1. Field of the Invention

Embodiments of the present invention relate to techniques for securely accessing remote data sources. More specifically, embodiments of the present invention relate to a system and a method for establishing temporary and permanent credentials for secure online transactions.

2. Related Art

Providing a personalized shopping experience is becoming an increasingly important goal for retail businesses. Customers are beginning to value high-end services tailored to their individual needs, such as personalized shopping lists, recommendations, product customizations, and expedited checkout. Typically, a valued customer identifies herself in a retail store by The proliferation of online shopping provides consumers with unprecedented convenience. However, providing an effortless personalized shopping experience over the Internet is not an easy task. A user of a retail website is often required to complete a time-consuming registration process. Furthermore, to receive personally tailored web pages, the user often needs to configure the web pages manually. The task of inputting registration information and configuring web pages can be difficult for a customer who is unfamiliar with navigating through the Internet. Such an online experience may even frustrate a customer who is familiar with the membership-based services in retail stores. As a result, a retailer may lose potential sales. Currently, there is no online shopping system which provides personalized services with the same level of ease as is available in a retail store.

For many Internet users, online shopping is not the only frustrating online experience. Many Internet applications require secure access to remote data sources, which typically involves a user having to perform configuration operations, such as setting up a username and a password, specifying protocol parameters, and configuring network addresses. For example, to set up a Virtual Private Network (VPN) tunnel, a user needs to provide an Internet Protocol (IP) address, a username, and a password. A user who is not comfortable with this configuration process may be reluctant to use these applications. Consequently, many users cannot readily take advantage of services that provide wireless network access and remote data storage and retrieval.

Hence, there is a need for a system that facilitates secure remote data access which requires minimal manual configuration.

SUMMARY

One embodiment of the present invention provides a system for establishing temporary and permanent credentials for secure remote data access. The system includes a temporary smart card configured to provide a temporary credential for a first device, thereby providing the first device with temporary secure access to a remote data source when the temporary smart card is used with the first device. Additionally, the system includes an enrollment smart card configured to provide a permanent credential for a second device, thereby providing the second device with permanent secure access to the remote data source without presence of the enrollment smart card or the temporary smart card.

In a variation of this embodiment, the temporary smart card stores a private key $priv_T$, a certificate $[pub_T]_E$ which contains a public key for the temporary smart card signed with a private key for the enrollment smart card, a certificate $[pub_E]_F$ which contains a public key for the enrollment smart card signed with a private key for a certification authority, and a root certificate $[pub_F]_F$ which contains a public key for the certification authority signed with the private key for the certification authority.

In a further variation, while providing the temporary credential for the first device, the temporary smart card is configured to communicate $[pub_T]_E$ and $[pub_E]_F$ to a remote computer controlling access to the data source, thereby establishing a certificate chain to facilitate subsequent secure communications between the first device and the remote computer.

In one variation of this embodiment, the enrollment smart card stores a private key $priv_E$, a certificate $[pub_T]_E$ which contains a public key for the temporary smart card signed with the private key $priv_E$, a certificate $[pub_E]_F$ which contains a public key for the enrollment smart card signed with the private key $priv_E$, and a root certificate $[pub_F]_F$ which contains a public key for the certification authority signed with the private key for the certification authority.

In a further variation, certificates $[pub_E]_F$ and $[pub_F]_F$ both contain an Abstract Syntax Notation One (ASN.1) object identifier (OID) which can be used to authorize $[pub_E]_F$ to provide the permanent credential for the second device.

In a further variation, while providing the permanent credential for the second device, the enrollment smart card is configured to communicate $[pub_E]_F$ to a remote computer controlling access to the data source, thereby establishing a certificate chain to facilitate subsequent secure communications between the second device and the remote computer. Additionally, the enrollment smart card is configured to allow the second device to generate a pair of public key and private key, denoted as $pub_C$ and $priv_C$, respectively; to receive from the remote computer a certificate $[pub_C]_M$ which contains the public key $pub_C$ signed with a private key for the remote computer and a certificate $[pub_M]_F$ which contains a public key for the remote computer signed with the private key for the certification authority; and to install a certificate chain, $[pub_C]_M$ and $[pub_M]_F$, to facilitate future secure communications between the second device and the remote computer.

In one variation of this embodiment, the system includes a remote computer controlling access to the data source. The remote computer stores a private key $priv_M$, a public key $pub_M$, a certificate $[pub_M]_F$ which contains the public key $pub_M$ signed by a private key for a certification authority, and a root certificate $[pub_F]_F$ which contains a public key for the certification authority signed with the private key for the certification authority.

In one variation of this embodiment, the system includes a certificate revocation list. If the temporary smart card or the enrollment smart card is lost, the certificate revocation list is configured to include a certificate $[pub_T]_E$ which contains a public key for the temporary smart card signed with a private key for the enrollment smart card and a certificate $[pub_E]_F$ which contains a public key for the enrollment smart card signed with a private key for the temporary smart card.

In one variation of this embodiment, the system includes a card information database configured to receive and store information about a user to whom the temporary smart card and the enrollment smart card are issued. Additionally, the card information database is configured to provide user information in response to the user's use of the temporary smart card or the enrollment smart card.

In a further variation, while providing user information, the card information database is configured to provide a list of websites tailored to the user's needs.

In a further variation, if the temporary smart card or the enrollment smart card is lost, the card information database is configured to revoke both cards and to communicate the revocation to one or more computers controlling access to the data source.

In a further variation, the card information database is configured to aggregate the information about a user to whom a plurality of temporary smart cards and enrollment smart cards have been issued, and to provide the aggregated user information in response to the user's use of any one of the said plurality of temporary smart cards and enrollment smart cards.

In one variation of this embodiment, the system further includes a hybrid smart card. The hybrid smart card can provide a temporary credential or a permanent credential for a device. The temporary credential facilitates temporary secure access the remote data source, and the permanent credential facilitates permanent secure access to the remote data source. The hybrid smart card also allows a user to determine whether the device is to be given the temporary credential or the permanent credential when the hybrid smart card is inserted in the device.

One embodiment of the present invention provides a system for establishing temporary and permanent credentials for secure date access. The system includes a home network server residing in a network identified by a network name. Additionally, the system includes a temporary smart card configured to provide a temporary credential for a first device, thereby providing the first device with temporary secure access to the home network server when the temporary smart card is used with the first device. The system further includes an enrollment smart card configured to provide a permanent credential for a second device, thereby providing the second device with permanent secure access to the home network server without presence of the enrollment smart card or the temporary smart card.

In a variation of this embodiment, the home network server is configured to establish a certificate chain on the temporary smart card and a certificate chain on the enrollment smart card, thereby facilitating secure data access to the home network server.

In a variation of this embodiment, while providing the permanent credential for the second device, the enrollment smart card is configured to allow the second device to generate a pair of private key and public key and to obtain necessary certificates for establishing a certificate chain to facilitate secure communications between the second device and the home network server.

In a variation of this embodiment, the temporary smart card is configured to grant to the first device temporary access to a wireless network to which the home network server is coupled.

In a variation of this embodiment, the enrollment smart card is configured to grant to the second device permanent access to a wireless network to which the home network server is coupled.

In a variation of this embodiment, the temporary smart card stores computer instructions which can be automatically executed by the first device to invoke a web browser for temporary secure online shopping, to provide temporary access to a wireless network to which the home network server is coupled, or to provide temporary secure access to the home network server.

In a variation of this embodiment, the enrollment smart card stores computer instructions which can be automatically executed by the second device to invoke a web browser for permanent secure online shopping, to provide permanent access to a wireless network to which the home network server is coupled, or to provide permanent secure access to the home network server.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Personalized Shopping with Temporary and Enrollment Smart Cards

Embodiments of the present invention provide a pair of smart cards, namely a temporary card and an enrollment card, to facilitate secure online commerce. A user can use the temporary card with an insecure computer to gain secure access to the user's personal information stored on a merchant's server or on the user's home server. The insecure computer loses the secure access as soon as the user removes the temporary card. Additionally, the user can use the enrollment card to grant permanent secure data access to a trusted computer. Hence, by using one of the two cards, the user can securely access a specified data source from any computer without having to configure the computer manually.

Figure 1:
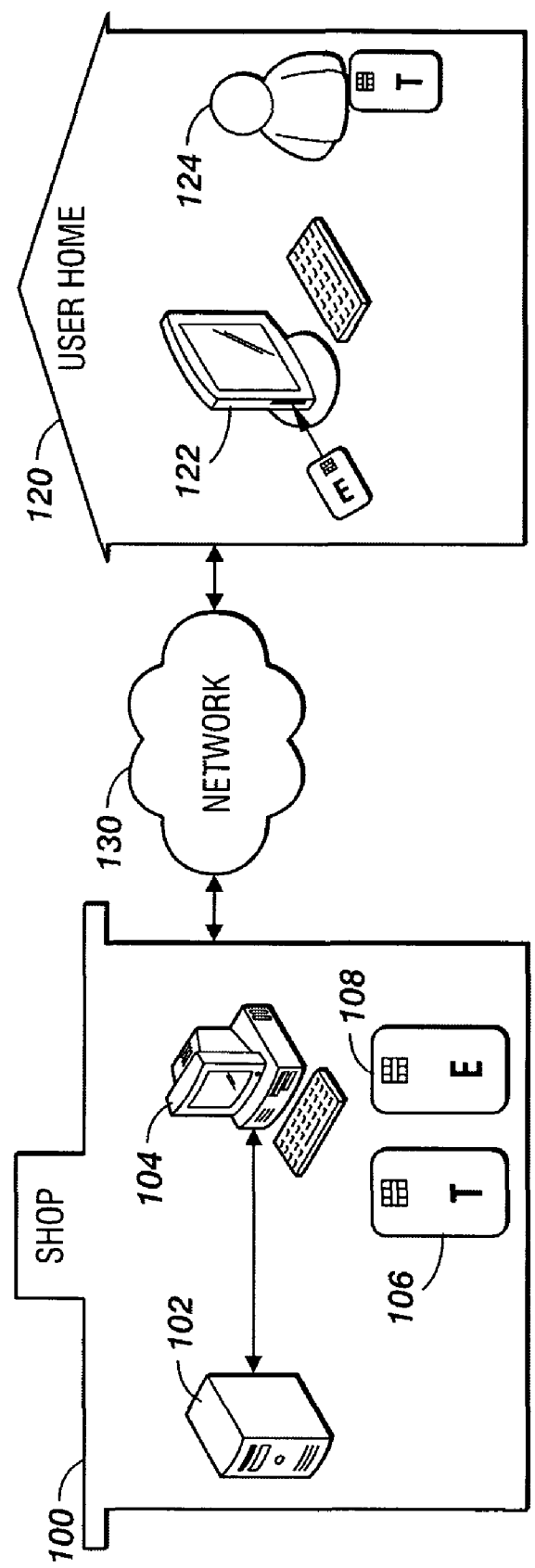
FIG. 1 illustrates how a user can use an enrollment smart card to enroll a home computer for permanent access to a merchant server in accordance with one embodiment of the present invention.

FIG. 1 illustrates how a user can use an enrollment smart card to enroll a home computer for permanent access to a merchant server in accordance with one embodiment of the present invention. When a user 124 shops at a shop 100 for the first time, a member of the retail staff associates a temporary smart card 106 and an enrollment smart card 108 with a merchant server 102. Merchant server 102 can store information about user 124, such as preferred merchandise and home address. The retail staff can perform this association process on a merchant console 104 which runs the association software. The retail staff can then issue a new pair of cards to the user, if the user does not already have a pair of cards. In a further embodiment, the retail staff can associate an existing pair of cards belonging to the user with merchant server 102.

Temporary card 106 allows user 124 to gain secure access to merchant server 102 by inserting temporary card 106 into an insecure computer. In contrast, enrollment card 108 allows user 124 to establish a permanent credential to a secure computer for accessing merchant server 102 without the presence of enrollment card 108. As is illustrated in this example, user 124 can later use enrollment card 108 to establish a permanent credential on a user computer 122, for example inside of a user's home 120. With the permanent credential in place, user computer 122 can securely access the user information stored on merchant server 102 over a network 130 without enrollment card 108.

Figure 2:
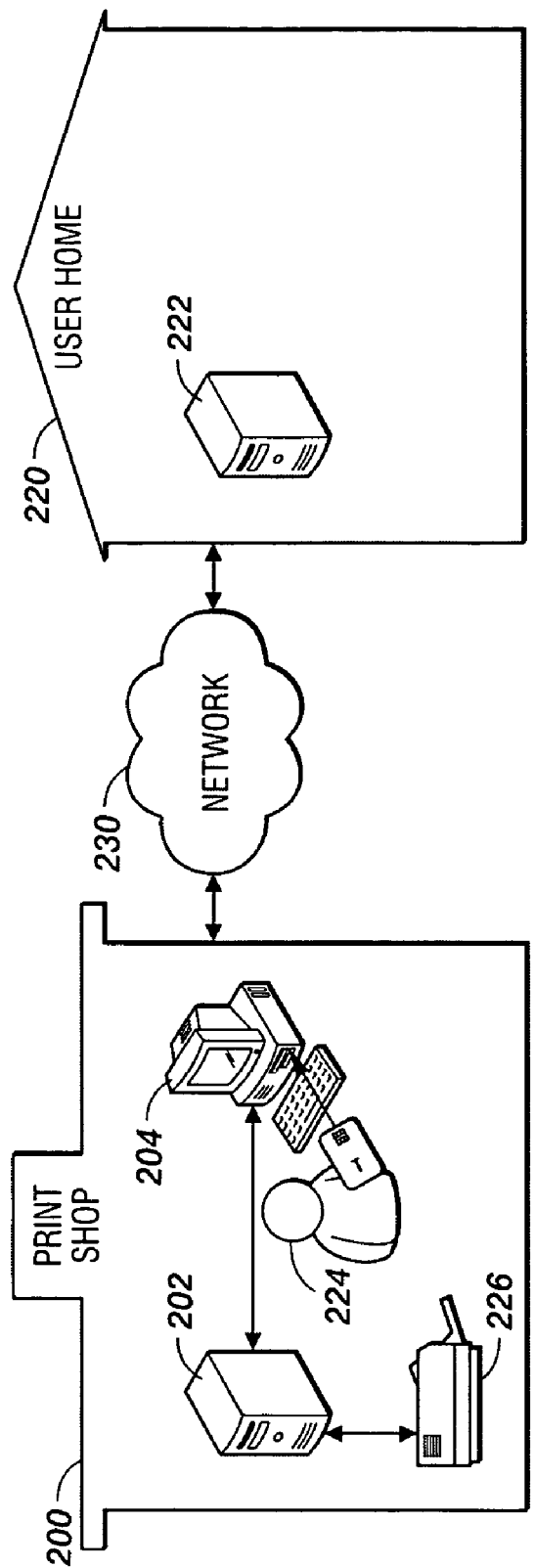
FIG. 2 illustrates how a user can use a temporary smart card to grant a merchant console access to data stored on a home network server in accordance with one embodiment of the present invention.

A user can use a temporary card to obtain secure access from an insecure public computer. FIG. 2 illustrates how a user can use a temporary smart card to grant a merchant console access data stored on a home network server in accordance with one embodiment of the present invention. In this example, a user 224 visits a print shop 200 to purchase prints of digital photos, which are stored in a user home server 222 located at the user's home 220.

While in print shop 200, user 224 inserts a temporary card into a public console computer 204. The temporary card allows console 204 to access user home server 222 and to obtain files for the digital photos through a network 230. Console 204 subsequently transfers these files to a printer server 202 coupled to a digital photo printer 226. Hence, user 224 can easily purchase photo prints without bringing in the digital storage medium into the shop.

Figure 3:
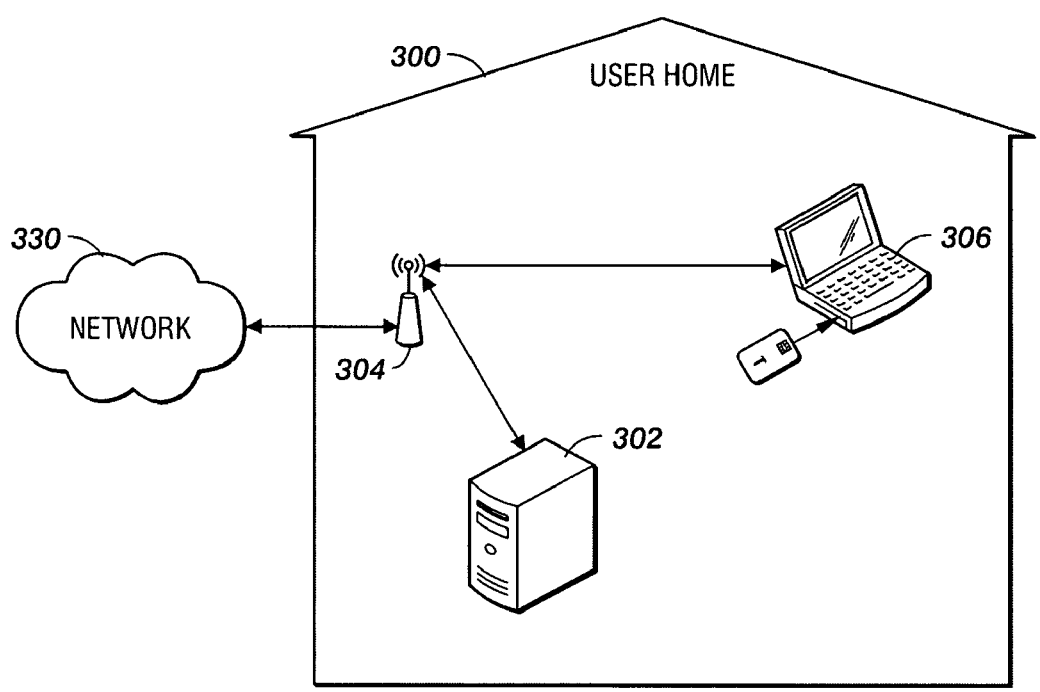
FIG. 3 illustrates how a user can use a temporary smart card to grant temporary wireless-network access to a guest computer in accordance with one embodiment of the present invention.

Besides online shopping and remote access to a home server, a user can also use the temporary and enrollment cards for home-networking purposes. For example, FIG. 3 illustrates how a user can use a temporary smart card to grant temporary wireless-network access to a guest computer in accordance with one embodiment of the present invention. In this example, a user operates a home network server 302 inside of the user's home 300. Home network server 302 is in communication with a wireless access point 304, which is coupled to a network 330 and which provides Internet connectivity to a number of networked computing devices within home 300.

When a guest with a portable guest computer 306 is visiting the user, the user can insert a temporary card into guest computer 306. As long as the temporary card remains in guest computer 306, guest computer 306 is authorized to access the wireless network through access point 304. In addition, the user can use the temporary card to authorize guest computer 306 to access data on home network server 302. The user can additionally use the enrollment card to give any computing device in home 300 permanent access to access point 304 or to home network server 302.

System Initialization

Embodiments of the present invention use the Public Key Infrastructure (PKI) to perform the aforementioned operations. (PKI and additional cryptography concepts are explained in Bruce Schneier, "Applied Cryptography," 2nd Ed., John Wiley & Sons, 1996.) According to one embodiment, the system establishes a chain of digital certificates to facilitate secure communications between two entities.

At initialization, the system first generates a pair of cryptographic keys which includes a public key, denoted as $pub_F$, and a private key, denoted as $priv_F$. The system also generates a self-signed root certificate, denoted as $[pub_F]_F$, which contains public key $pub_F$ signed with private key $priv_F$. In one embodiment, the generation of the key pair and the root certificate occurs at a certification authority (CA), and the root certificate is assumed to be publicly available.

Prior to association with a user or a merchant, the smart cards initially store certain cryptographic information. Initially, an enrollment card generates a public-key/private-key pair, denoted as ($pub_E$, $priv_E$). A temporary card also generates a public-key/private-key pair, denoted as ($pub_T$, $priv_E$). Additionally, the enrollment card stores the following information:

a certificate containing $pub_T$ signed with $priv_E$, denoted as $[pub_T]_E$;
the private key $priv_E$;
a certificate containing $pub_E$ signed with $priv_F$, denoted as $[pub_E]_F$; and
the root certificate $[pub_F]_F$.

The temporary cards stores the following information:

the private key $priv_T$;
a certificate containing $pub_T$ signed with $priv_E$, denoted as $[pub_T]_E$;
a certificate containing $pub_E$ signed with $priv_F$, denoted as $[pub_E]_F$; and
the root certificate $[pub_F]_F$.

Furthermore, the certificates $[pub_E]_F$ and $[pub_F]_F$ contain an Abstract Syntax Notation One (ASN.1) object identifier (OID) for authorizing the use of enrollment card for enrollment purposes.

During initialization, a merchant server also generates a key pair ($pub_M$, $priv_M$). The merchant server then requests and obtains a certificate $[pub_M]_F$ from the certification authority. The merchant server also receives a copy of the root certificate $[pub_F]_F$. Furthermore, the merchant can install software on a number of in-store computers to create merchant consoles.

Association of User Cards with Merchant

When a customer is shopping at a merchant's shop and decides to receive a pair of cards to enjoy personalized online shopping in the future, a member of the retail staff retrieves a newly-manufactured card pair and inserts the temporary card into a merchant console. The merchant console subsequently executes a series of operations to associate the temporary card with the merchant.

Figure 4:
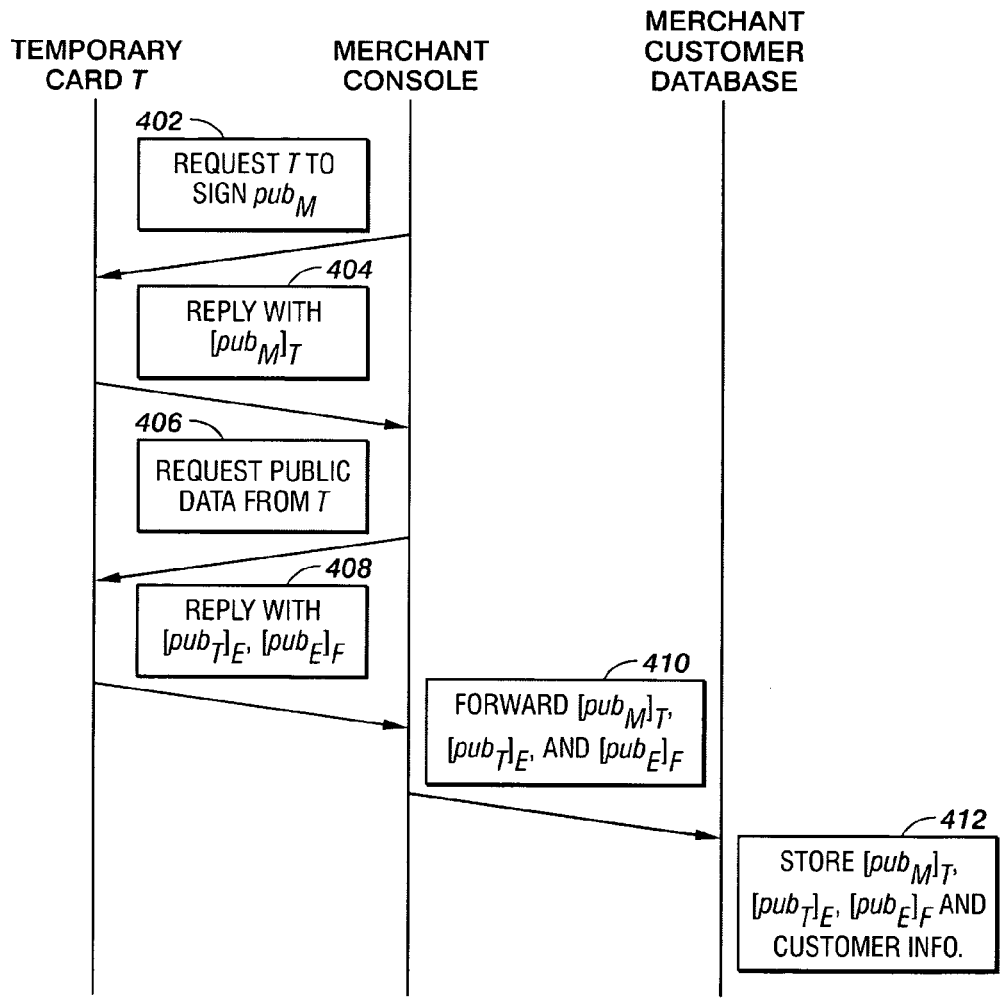
FIG. 4 presents a time-space diagram illustrating the process of associating a temporary smart card with a merchant in accordance with one embodiment of the present invention.

FIG. 4 presents a time-space diagram illustrating the process of associating a temporary smart card with a merchant in accordance with one embodiment of the present invention. During operation, the merchant console first requests the temporary card, denoted as T, to sign the public key $pub_M$ with private key $priv_T$ (step 402). In one embodiment, the request complies with the Public Key Cryptography Standards #10 (PKCS#10). In response, the temporary card replies with certificate $[pub_M]_T$ containing public key $pub_M$ signed with $priv_T$.

The merchant console subsequently requests the public data stored on the temporary card (step 406). The temporary card replies with certificates $[pub_T]_E$ and $[pub_E]_F$ (step 408). As a result, the merchant console obtains a certificate chain from the temporary card, which includes $[pub_T]_E$, $[pub_E]_F$, and $[pub_F]_F$. The merchant console further forwards $[pub_M]_T$, $[pub_T]_E$, and $[pub_E]_F$ to a merchant customer database which can be running on a merchant server (step 410). The merchant customer database subsequently stores the received certificates and the corresponding customer information (step 412).

If the customer already has a pair of cards and wishes to associate her cards with the merchant, the merchant console can perform the aforementioned steps to associates the temporary card with the merchant.

Using Temporary Card with Insecure Computer

A user can insert the temporary card into an insecure computer, such as a public kiosk computer, to gain temporary secure access to a merchant website or a home server and retrieve confidential personal information. For example, the user can navigate the web browser to the merchant website secure.merchant.com, upon which the browser opens a Secure Socket Layer (SSL) to the merchant's server. At this point, both client authentication and server authentication become active. Server authentication uses standard certificates, and client authentication uses certificates stored on the temporary card. In one embodiment, the authentication process complies with the SSL or Transport Layer Security (TSL) protocol as specified in the Internet Engineering Task Force Request for Comments (IETF RFC) 2246, which is herein incorporated by reference.

Figure 5:
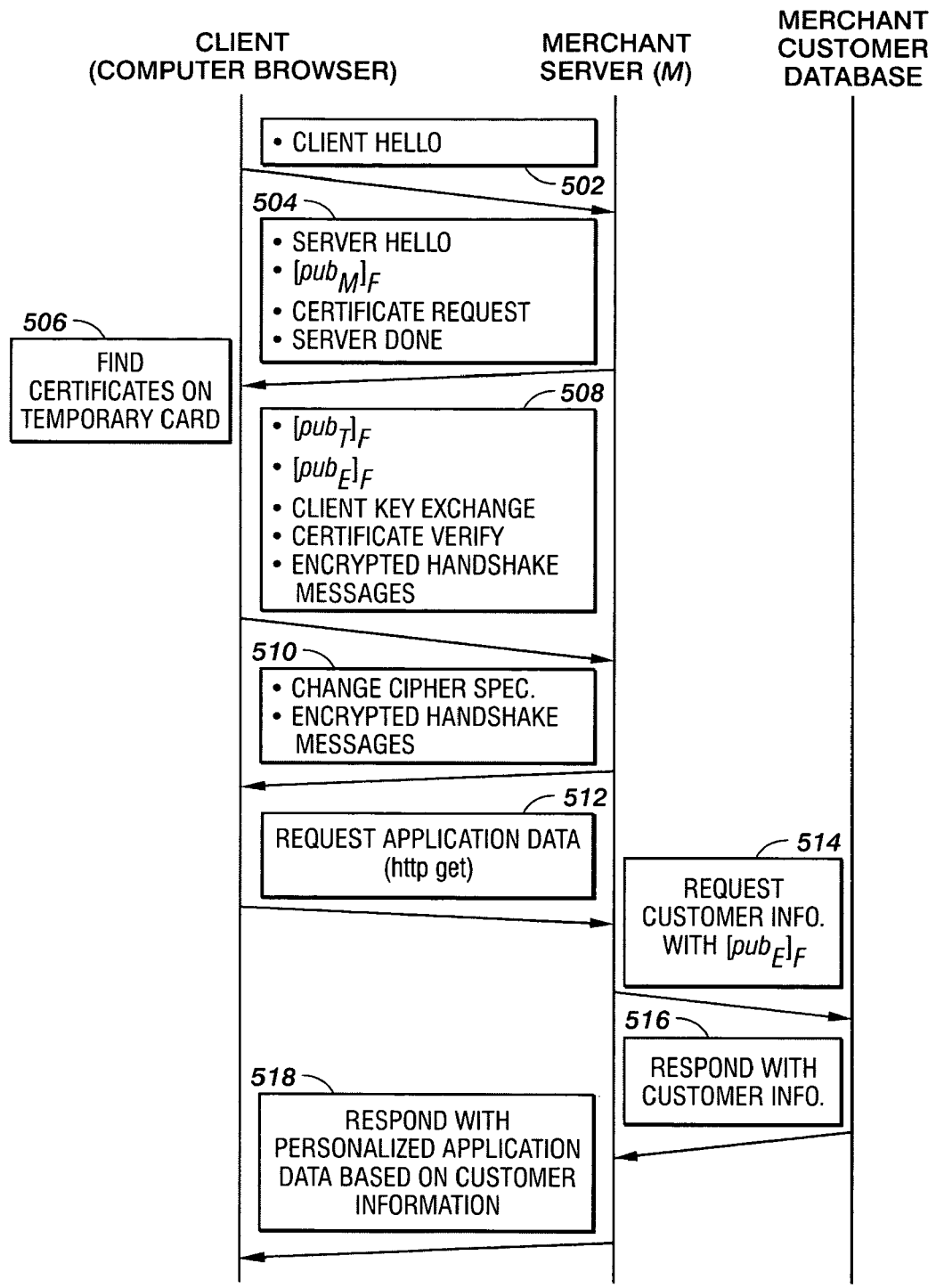
FIG. 5 presents a time-space diagram illustrating the process of using a temporary smart card to grant a computer temporary access to a merchant server in accordance with one embodiment of the present invention.

FIG. 5 presents a time-space diagram illustrating the process of using a temporary smart card to grant a computer temporary access to a merchant server in accordance with one embodiment of the present invention. During operation, the client computer sends a HELLO message to the merchant server, denoted as M (step 502). The merchant server replies with a server HELLO messages, a certificate $[pub_M]_F$, a CERTIFICATE REQUEST message, and a SERVER DONE message (step 504). In response, the browser on the client finds the certificates on the temporary card (step 506). In one embodiment, the browser issues a request in compliance with the Microsoft Cryptographic Application Program Interface (CAPI) or with the PKCS#11 standard.

The client subsequently transmits a certificate $[pub_T]_E$, a certificate $[pub_E]_F$, a CLIENT KEY EXCHANGE message, a CERTIFICATE VERIFY message, and a FINISHED message including encrypted handshake messages starting from client HELLO up to, but not including, the current FINISHED message (step 508). The merchant server responds with a CHANGE CIPHER SPEC message and a FINISHED message including encrypted handshake messages (step 510). At this point, both server authentication and client authentication are complete.

The client then sends a request for application data (step 512). For example, the client browser can send an "http get" command to retrieve web data from the merchant server. Upon receiving the request, the merchant server sends the certificate $[pub_E]_F$ to a merchant customer database to request the customer information (step 514). The merchant customer database responds with the customer information (step 516).

The merchant server then responds to the client browser with personalized application data based on the customer information (step 518).

Establishing Permanent Credential with Enrollment Card

After a user has associated her temporary card to a merchant, she can set up a trusted computer to receive secure, personalized web content from the merchant without the presence of the temporary card. During operation, the user inserts the enrollment card, denoted as E, into the trusted computer, denoted as C, and navigates to the merchant website secure.merchant.com. In one embodiment, the browser on C initiates an SSL session to the merchant server, denoted as M. At this point, both client authentication and server authentication become active. Server authentication uses standard certificates, and client authentication uses certificates stored on the enrollment card.

Because both $[pub_E]_F$ and $[pub_F]_F$ contain the OID for enrollment, the merchant server can determine when an enrollment card is used. Once the server authentication and client authentication are complete and an SSL/TLS tunnel is set up, computer C's browser can generate a key pair ($pub_C$, $priv_C$). $pub_C$ is then submitted to the server in a certificate request. The server replies with a certificate chain ($[pub_C]_M$, $[pub_M]_F$). Computer C can use $[pub_C]_M$ for secure access to the merchant server from then on. In one embodiment, the authentication process complies with the SSL or TSL protocol as specified in IETF RFC 2246.

Figure 6:
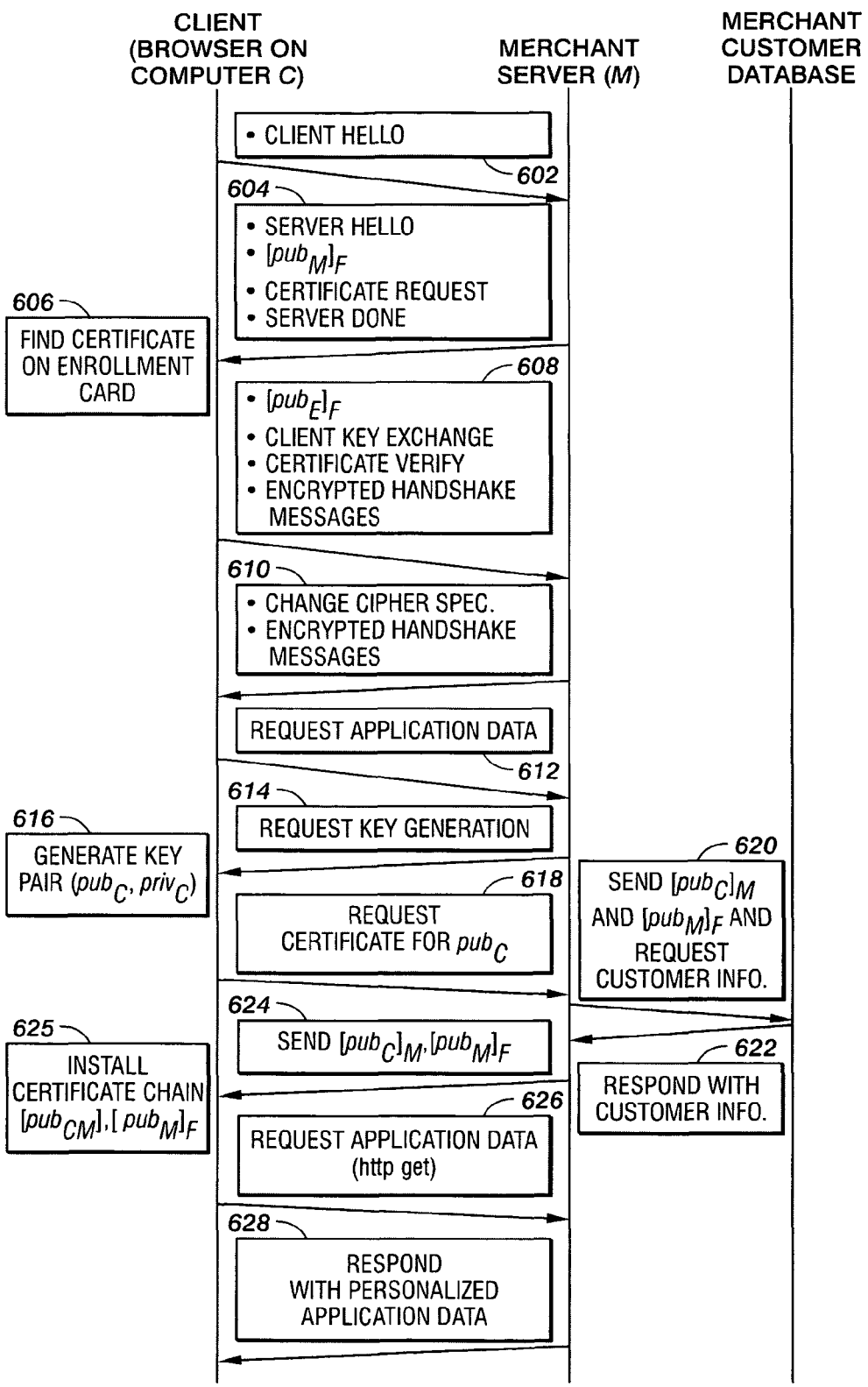
FIG. 6 presents a time-space diagram illustrating the process of using an enrollment smart card to grant a computer permanent access to a merchant server in accordance with one embodiment of the present invention.

FIG. 6 presents a time-space diagram illustrating the process of using an enrollment smart card to grant a computer permanent access to a merchant server in accordance with one embodiment of the present invention. The client computer starts by sending a HELLO message to the merchant server (step 602). The merchant server replies with a server HELLO message, a certificate $[pub_M]_F$, a CERTIFICATE REQUEST message, and a SERVER DONE message (step 604). In response, the client browser obtains the certificate on the enrollment card, for example via a CAPI or PKCS#11 request (step 606).

The client browser subsequently transmits a certificate $[pub_E]_F$, a CLIENT KEY EXCHANGE message, a CERTIFICATE VERIFY message, and a FINISHED message including encrypted handshake messages (step 608). The merchant server responds with a CHANGE CIPHER SPEC message and a FINISHED message including encrypted handshake messages (step 610). At this point, both server authentication and client authentication are complete.

The client then requests for application data (step 612). In response, the merchant server requests the client computer to generate a key pair (step 614). Client computer C subsequently generates a key pair ($pub_C$, $priv_C$) (step 616), and requests a certificate for $pub_C$ from the merchant server (step 618). The merchant server produces a certificate $[pub_C]_M$, sends $[pub_C]_M$ and $[pub_M]_F$ to the merchant customer database, and requests customer information (step 620). The customer database adds $[pub_C]_M$ to the customer information and responds with customer information (step 622). The merchant server sends $[pub_C]_M$ and $[pub_M]_F$ to the client and requests the client computer to install a certificate chain (step 624).

The client subsequently installs the certificate chain ($[pub_C]_M$, $[pub_M]_F$) (step 625) and requests application data (step 626). The server responds with personalized application data based on customer information received from the customer database (step 628).

Figure 7:
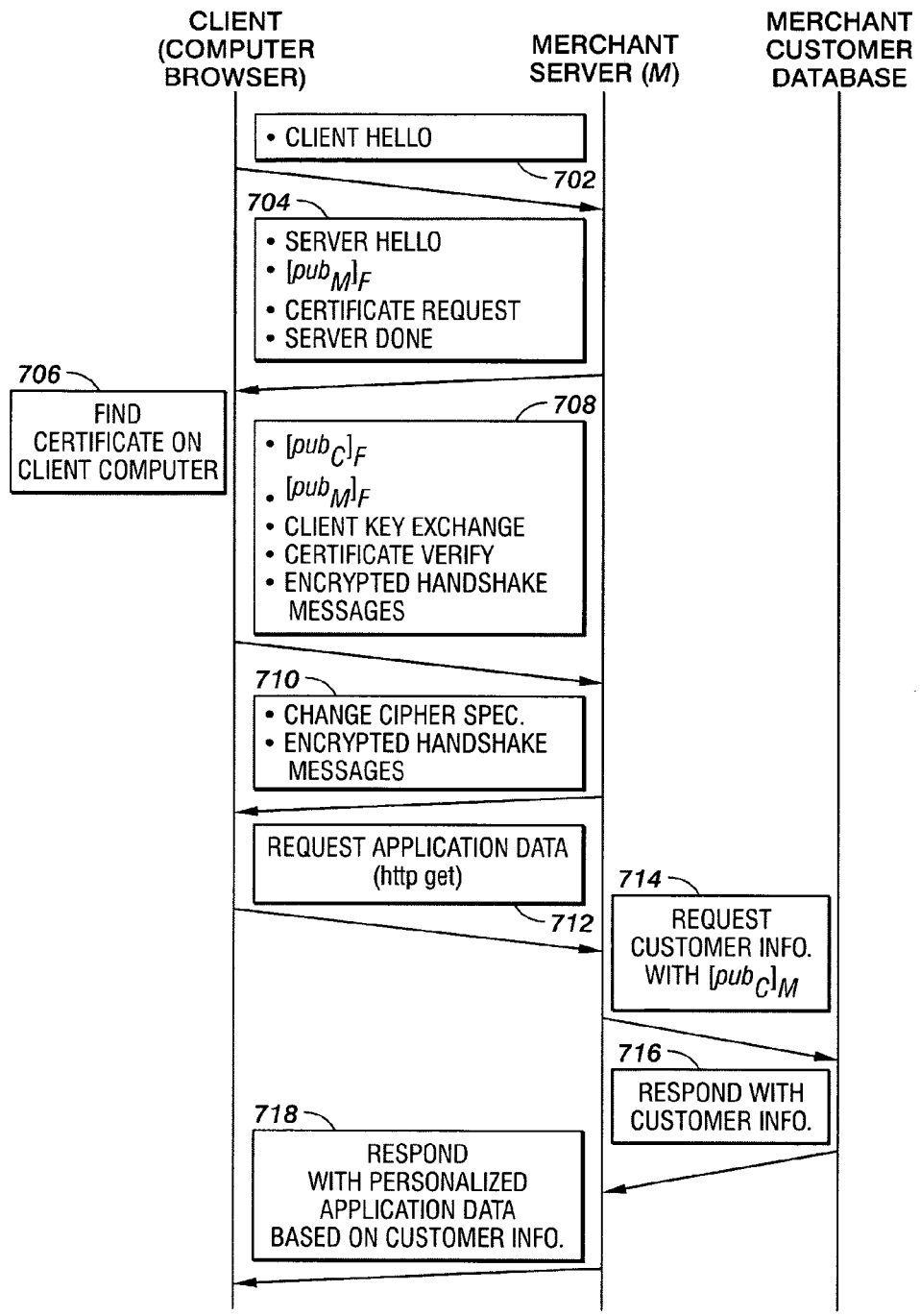
FIG. 7 presents a time-space diagram illustrating the process of accessing a merchant server from a previously enrolled computer in accordance with one embodiment of the present invention.

FIG. 7 presents a time-space diagram illustrating the process of accessing a merchant server from a previously enrolled computer in accordance with one embodiment of the present invention. During operation, the client computer sends a HELLO message to the merchant server (step 702). The merchant server replies with a server HELLO messages, a certificate $[pub_M]_F$, a CERTIFICATE REQUEST message, and a SERVER DONE message (step 704). In response, the browser on the client finds the certificate stored on the client computer (step 706).

The client subsequently transmits a certificate $[pub_C]_M$, a certificate $[pub_M]_F$, a CLIENT KEY EXCHANGE message, a CERTIFICATE VERIFY message, and a FINISHED message including encrypted handshake messages (step 708). The merchant server responds with a CHANGE CIPHER SPEC message and a FINISHED message including encrypted handshake messages (step 710). At this point, both server authentication and client authentication are complete.

The client then commences the request for application data (step 712). For example, the client browser can send an "http get" command to retrieve web data from the merchant server. Upon receiving the request, the merchant server sends the certificate $[pub_C]_M$ to a merchant customer database to request the customer information (step 714). The merchant customer database responds with the customer information (step 716). The merchant server then responds to the client browser with personalized application data based on the customer information (step 718).

Lost Card

If a user loses either an enrollment card or a temporary card, the user can contact one of the affected merchants. The merchant looks up the customer information and contacts the CA which places both the temporary card certificate $[pub_T]_E$ and the enrollment card certificate $[pub_E]_F$ on a certificate revocation list (CRL). The CA subsequently publishes the CRL to disallow further use of either card. Furthermore, if the enrollment card is lost, the merchant additionally requests the CA to place on the CRL any certificates $[pub_C]_E$ issued to devices since the time the enrollment card is lost. In one embodiment, access continues to be available to devices enrolled with the enrollment card after the temporary card and enrollment card are revoked.

Using Centralized Information Service

In one embodiment, the system uses a centralized information service provided by a card information server (CIS). The CIS provides a database to which merchant computers can add information about customer cards. During the card association process, a merchant typically sends the customer information and a certificate chain ($[pub_M]_T$, $[pub_T]_E$, $[pub_E]_F$) to the CIS.

When a customer uses her temporary card, she can navigate her web browser to a known card user portal which provides secure links to merchant web pages, instead of having to type in the merchant websites by hand. When using an enrollment card, the user can also navigate to the card user portal and navigate to a merchant's website. The user can then give her computer a permanent secure access to that merchant's website.

The CIS simplifies the process of revoking lost cards by allowing a user or a merchant to contact the CIS to report a lost card. Because the CIS maintains a centralized tracking of all cards, the CIS can push out a card revocation to all affected merchants using a standard protocol. Furthermore, once a replacement card has been issued to the user, the CIS can push out an update to all the affected merchants.

The CIS also facilitates easy management of cards if a user obtains more than one pair of cards. For example, if two merchants issue separate card pairs to a user and the user information-collection process occurs twice, the user can contact the CIS to request that the two pairs be functionally merged into one pair. The CIS facilitates the merge by aggregating the user information at the user's request, so that a single card pair indexes the aggregate user information. Furthermore, the CIS can provide the aggregated user information in response to the user's use of any one of the issued temporary cards or the enrollment cards.

Using a Home Network Server

When a user uses a home network server, she can also use the smart card pair to gain secure remote access to the data stored therein, or to provide secure access to a home wireless network. In one embodiment, the home network server is denoted as FNS. The FNS generates two key pairs, namely ($pub_{FNS}$, $priv_{FNS}$) and ($pub_{FNS\text{-}Server}$, $priv_{FNS\text{-}Server}$). The FNS generates a root certificate $[pub_{FNS}]_{FNS}$ and a second certificate $[pub_{FNS\text{-}Server}]_{FNS}$ based on the two key pairs. If the user uses the card pair to grant wireless access, the FNS also assigns a network name, for example a service set identifier (SSID), the local wireless network.

When the user obtains a card pair, she first associates the card pair with the FNS, one at a time. The cards store the certificates, the network name (SSID), and other network information about the FNS, such as the IP address and the Domain Name Service (DNS) hostname.

Figure 8A:
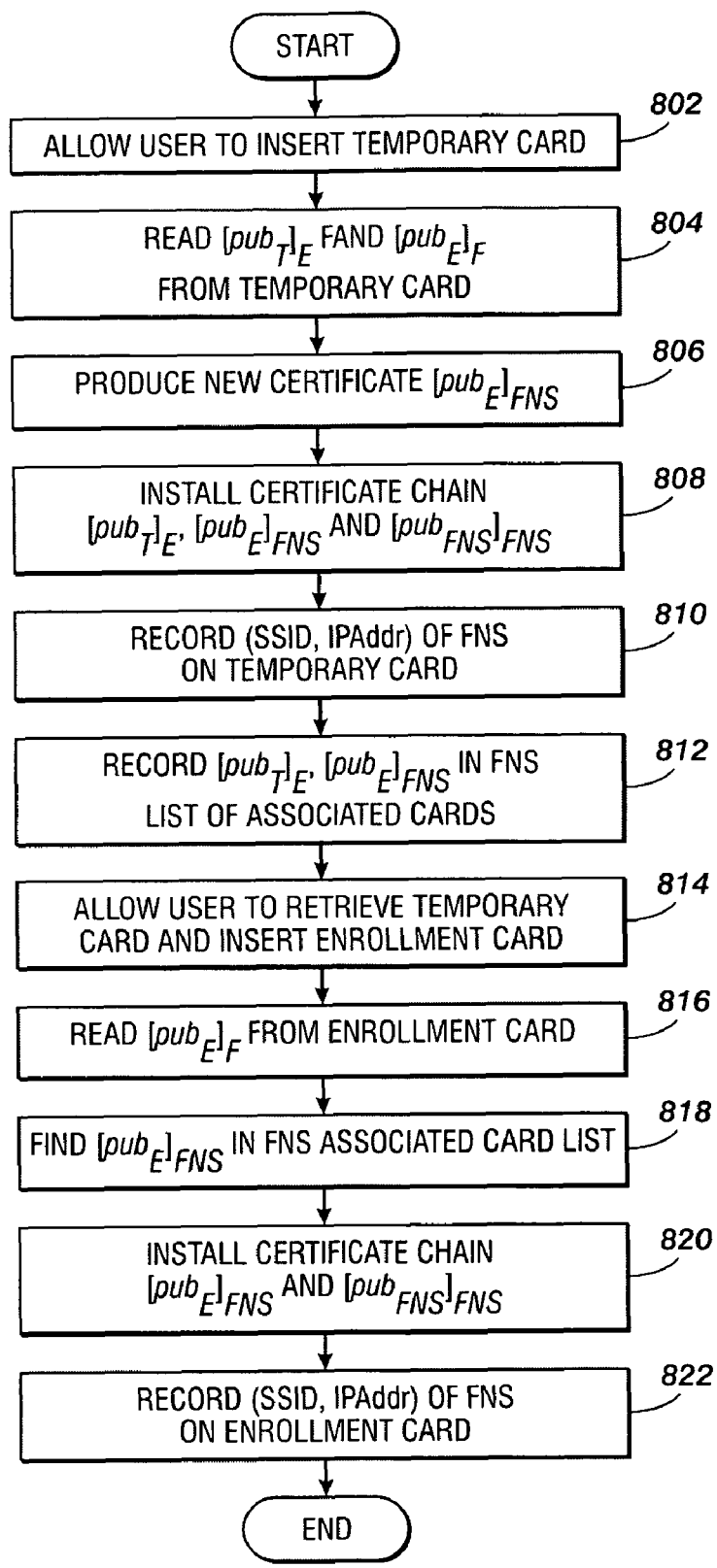
FIG. 8A presents a flow-chart illustrating the process of associating first a temporary smart card and then an enrollment smart card with a home network server in accordance with one embodiment of the present invention.

FIG. 8A presents a flow-chart illustrating the process of associating first a temporary smart card and then an enrollment smart card with a home network server in accordance with one embodiment of the present invention. During operation, the FNS starts by allowing the user to insert the temporary card (step 802), and reads $[pub_T]_E$ and $[pub_E]_F$ from the temporary card (step 804). The FNS subsequently produces a certificate $[pub_E]_{FNS}$ which includes the public key $pub_E$ signed with the root private key $priv_{FNS}$ and an OID for enrollment purposes (step 806). The FNS then installs a certificate chain ($[pub_T]_E$, $[pub_E]_{FNS}$, $[pub_{FNS}]_{FNS}$) on the temporary card (step 808). The temporary card also records the SSID and IP address of the FNS (step 810). The FNS then records $[pub_T]_E$ and $[pub_E]_{FNS}$ in a list of associated cards (step 812).

The FNS subsequently allows the user to retrieve the temporary card and insert the enrollment card (step 814). Next, the FNS reads $[pub_E]_F$ from the enrollment card (step 816), and finds $[pub_E]_{FNS}$ from the list of associated cards (step 818). The FNS subsequently installs a certificate chain ($[pub_E]_{FNS}$, $[pub_{FNS}]_{FNS}$) on the enrollment card (step 820), and records the SSID and IP address of the FNS on the enrollment card (step 822).

Figure 8B:
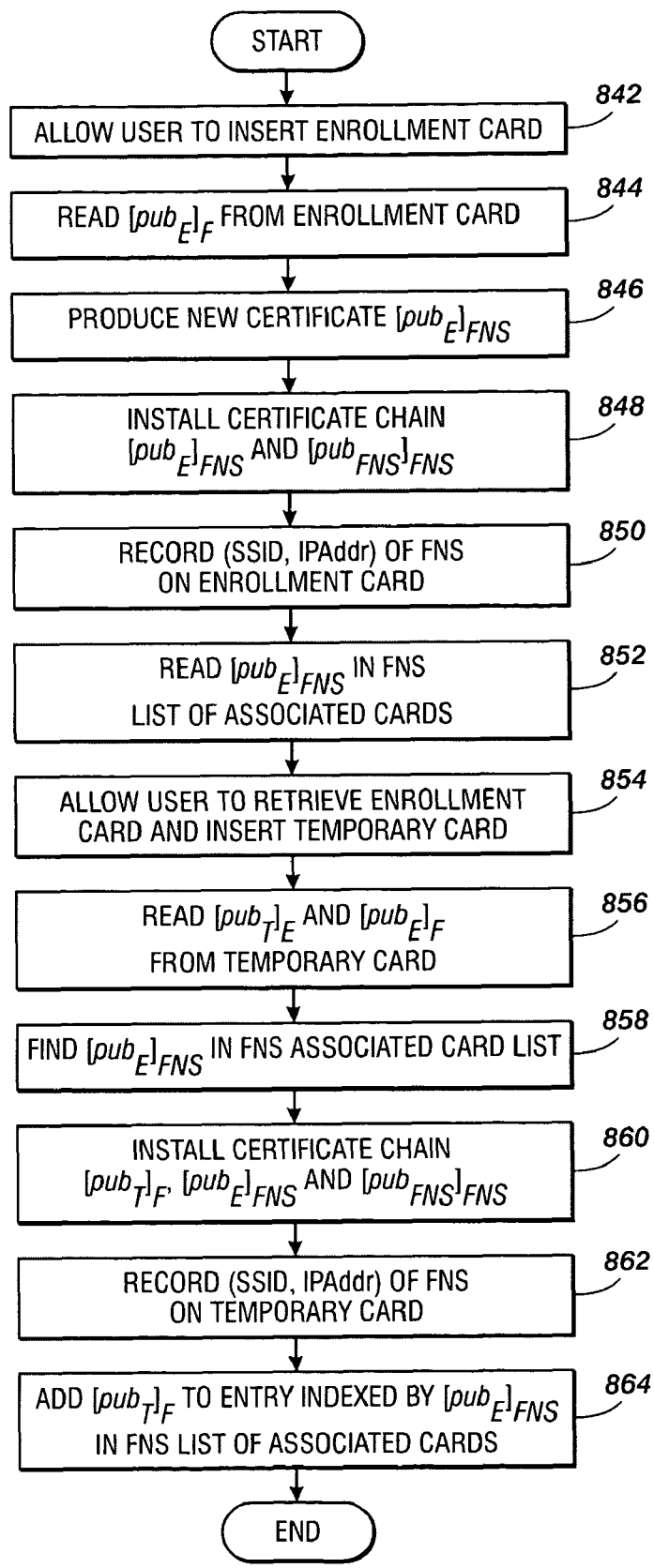
FIG. 8B presents a flow-chart illustrating the process of associating first an enrollment smart card and then a temporary smart card with a home network server in accordance with one embodiment of the present invention.

FIG. 8B presents a flow-chart illustrating the process of associating first an enrollment smart card and then a temporary smart card with a home network server in accordance with one embodiment of the present invention. During operation, the FNS starts by allowing the user to insert the enrollment card (step 842), and reads $[pub_E]_F$ from the enrollment card (step 844). The FNS subsequently produces a certificate $[pub_E]_{FNS}$ which includes the public key $pub_E$ signed with the root private key $priv_{FNS}$ and an OID for enrollment purposes (step 846). The FNS then installs a certificate chain ($[pub_E]_{FNS}$, $[pub_{FNS}]_{FNS}$) on the enrollment card (step 848). The enrollment card records the SSID and IP address of the FNS (step 850). The FNS then records $[pub_E]_{FNS}$ in a list of associated cards on the FNS (step 852).

The FNS subsequently allows the user to retrieve the enrollment card and insert the temporary card (step 854). Next, the FNS reads $[pub_T]_E$ and $[pub_E]_F$ from the temporary card (step 856), and finds $[pub_E]_{FNS}$ from the list of associated cards (step 858). The FNS subsequently installs a certificate chain ($[pub_T]_F$, $[pub_E]_{FNS}$, $[pub_{FNS}]_{FNS}$) on the temporary card (step 860), and records the SSID and IP address of the FNS on the temporary card (step 862). The FNS also adds $[pub_T]_F$ to an entry indexed by $[pub_E]_{FNS}$ in the FNS's list of associated cards (step 864).

In one embodiment, a pair of cards can be associated to only one FNS. Allowing multiple associations may expose the user to the possibility that a computer presents itself as an FNS to disrupt the use of the cards. In a further embodiment, either the temporary card or the enrollment card can contain a number of auto-run applications, which include opening a browser for secure shopping, allowing temporary access to a wireless network, and allowing temporary remote access to the user's FNS network.

If the user grants temporary access to a wireless network to a computer by inserting the temporary card, the software on the temporary card automatically installs a wireless profile to connect to the wireless network provided by the FNS. In one embodiment, the wireless profile is based on the IEEE 802.1x/EAP-TLS wireless security standard and is authenticated by digital certificates. The wireless profile instructs the wireless networking subsystem to use the digital certificate stored on the temporary card for authentication. The access to the wireless network is revoked as soon as the temporary card is removed.

If the user uses the enrollment card to grant permanent access to a wireless network, the software on the enrollment card automatically installs a client program to perform the EAP-PTLS process. No additional logical-link control (LLC) sublayer exchange is necessary, because the FNS trusts the public key of the enrollment card. Note that the FNS also ensures that the client certificate used in the EAP-PTLS process contains the enrollment OID. The EAP-PTLS process results in a new digital certificate and a wireless profile for the computer to access the wireless network based on the IEEE 802.1x/EAP-TLS standard. The wireless profile then instructs the wireless networking subsystem to use the new digital certificate for authentication.

If the user uses the temporary card to give access to data stored on the FNS, the software on the temporary card automatically installs a VPN profile. This VPN profile uses the digital certificate stored on the temporary card for authentication. In a further embodiment, a file-sharing application can use the certificate to gain secure remote access to the data. For example, the user can obtain secure access to her FNS in a photo shop to select and print digital photos.

The user can use the enrollment card to give permanent data access to her FNS. When the user inserts the enrollment card, the software contained therein automatically requests and receives a digital certificate from the FNS and installs a VPN profile which uses the digital certificate just obtained. In this way, the VPN profile remains available after the enrollment card is removed. If the user loses one of the cards, the FNS can provide a management web page allowing the user to revoke the cards. Upon revocation, the FNS places $[pub_T]_E$ and $[pub_E]_{FNS}$ on an internal revocation list. In a further embodiment, the user may communicate with a CIS which pushes the revocation to the FNS. Additionally, the management web page displays the enrolled devices and records the serial numbers of certificates issued to these devices. The management web page further allows the user to revoke access from any device C by placing $[pub_C]_{FNS}$ on the internal revocation list.

One-Card Operation

If issuing two separate cards—one for temporary access and one for permanent enrollment—is not desirable, embodiments of the present invention can encapsulate the functionality of both cards in a single card. In one embodiment, the card contains automatically executed code that allows the user to determine whether to give temporary access or permanent enrollment to a computer. For example, the smart card can automatically display a web page or a window prompting the user to choose one of the two options.

In some cases, a user may be using a public computer running untrusted software. Relying on the interface provided by such an untrusted computer to determine the user's intent can be insecure. Preferably, an external confirmation mechanism is employed to confirm the user's intent to grant either temporary or permanent access.

In one embodiment, the external confirmation mechanism depends on the level of access requested. For low-security operations, such as allowing temporary access only while the card is inserted, the system may not need additional confirmation beyond card insertion. For medium-security operations, such as using a card to join a device to an FNS's wireless network, the system may send an email to the user to give her an opportunity to revoke the newly granted access. For medium-to-high-security operations, such as allowing access for one day to certain files stored on an FNS, the user may receive a wireless Short Message Service (SMS) message warning of the pending operation and giving her a chance to cancel the grant of access. For high-security operations, such as allowing permanent access to all data stored on an FNS, the system may require the user to respond affirmatively to an email or SMS message, or, additionally, to enter a Personal Identification Number (PIN).

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A system for establishing temporary and permanent credentials for secure remote data access, the system comprising:

a temporary smart card configured to provide a temporary credential for a first insecure device, thereby providing the first insecure device with temporary secure access to a remote data source when the temporary smart card is used with the first insecure device, wherein the first insecure device loses the temporary secure access as soon as the temporary smart card is removed from the first insecure device;

an enrollment smart card configured to provide a permanent credential for a second trusted device, thereby providing the second trusted device with permanent secure access to the remote data source, wherein the second trusted device installs a certificate chain during enrollment and transmits certificates associated with the installed certificate chain to access the remote data source after the enrollment without presence of the enrollment smart card or the temporary smart card; and wherein when the temporary smart card or the enrollment smart card is lost, a certificate revocation list is configured to include:

a certificate $[pub_T]_E$ which contains a public key $pub_T$ for the temporary smart card signed with a private key $priv_E$ for the enrollment smart card; and a certificate $[pub_E]_F$ which contains a public key $pub_E$ for the enrollment smart card signed with a private key $priv_F$ for the temporary smart card.

2. The system of claim 1, wherein the temporary smart card stores:

a private key $priv_T$;

a certificate $[pub_T]_E$ which contains a public key $pub_T$ for the temporary smart card signed with a private key $priv_E$ for the enrollment smart card;

a certificate $[pub_E]_F$ which contains a public key $pub_E$ for the enrollment smart card signed with a private key $priv_F$ for a certification authority; and a root certificate $[pub_F]_F$ which contains a public key $pub_F$ for the certification authority signed with the private key $priv_F$ for the certification authority.

3. The system of claim 2, wherein while providing the temporary credential for the first insecure device, the temporary smart card is configured to communicate the $[pub_T]_E$ and the $[pub_E]_F$ to a remote computer controlling access to the data source, thereby establishing a certificate chain to facilitate subsequent secure communications between the first insecure device and the remote computer.

4. The system of claim 1, wherein the enrollment smart card stores:

a private key $priv_E$;

a certificate $[pub_T]_E$ which contains a public key $pub_T$ for the temporary smart card signed with the private key $priv_E$;

a certificate $[pub_E]_F$ which contains a public key $pub_E$ for the enrollment smart card signed with a private key $priv_F$; and a root certificate $[pub_F]_F$ which contains a public key $pub_F$ for the certification authority signed with the private key $priv_F$ for the certification authority.

5. The system of claim 4, wherein the certificates $[pub_E]_F$ and $[pub_F]_F$ both contain an Abstract Syntax Notation One (ASN.1) object identifier (OID) which can be used to authorize the $[pub_E]_F$ to provide the permanent credential for the second trusted device.

6. The system of claim 4, wherein while providing the permanent credential for the second device, the enrollment smart card is configured to:

communicate $[pub_E]_F$ to a remote computer controlling access to the data source, thereby establishing a certificate chain to facilitate subsequent secure communications between the second trusted device and the remote computer; and allow the second trusted device to:

generate a pair of public key and private key, denoted as $pub_C$ and $priv_C$, respectively;

receive from the remote computer a certificate $[pub_C]_M$ which contains the public key $pub_C$ signed with a private key $priv_M$ for the remote computer and a certificate $[pub_M]_F$ which contains a public key $pub_M$ for the remote computer signed with the private key $priv_F$ for the certification authority; and install a certificate chain, $[pub_C]_M$ and $[pub_M]_F$, to facilitate future secure communications between the second trusted device and the remote computer.

7. The system of claim 1, further comprising a remote computer controlling access to the data source, the remote computer storing:

a private key $priv_M$;

a public key $pub_M$;

a certificate $[pub_M]_F$ which contains the public key $pub_M$ signed by a private key $priv_F$ for a certification authority; and a root certificate $[pub_F]_F$ which contains a public key $pub_F$ for the certification authority signed with the private key $priv_F$ for the certification authority.

8. The system of claim 1, further comprising a card information database configured to:

receive and store information about a user to whom the temporary smart card and the enrollment smart card are issued; and to provide user information in response to the user's use of the temporary smart card or the enrollment smart card.

9. The system of claim 8, wherein while providing user information, the card information database is configured to provide a list of websites tailored to the user's needs.

10. The system of claim 8, wherein if the temporary smart card or the enrollment smart card is lost, the card information database is configured to revoke both cards and to communicate the revocation to one or more computers controlling access to the data source.

11. The system of claim 8, wherein the card information database is configured to aggregate the information about a user to whom a plurality of temporary smart cards and enrollment smart cards have been issued, and to provide the aggregated user information in response to the user's use of any one of said plurality of temporary smart cards and enrollment smart cards.

12. The system of claim 1, further comprising a hybrid smart card configured to:

provide a temporary credential or a permanent credential for a device, wherein the temporary credential facilitates temporary secure access the remote data source, and the permanent credential facilitates permanent secure access to the remote data source; and to allow a user to determine whether the device is to be given the temporary credential or the permanent credential when the hybrid smart card is inserted in the device.

13. A hybrid smart card for establishing temporary and permanent credentials for secure remote data access, the smart card configured to:

provide a temporary credential for an insecure device or a permanent credential for a trusted device, wherein the temporary credential facilitates temporary secure access to a remote data source when the temporary credential is used with the insecure device, wherein the insecure device loses the temporary secure access as soon as the smart card is removed from the insecure device, wherein the permanent credential facilitates permanent secure access to the remote data source by the trusted device, and wherein the trusted device installs a certificate chain during enrollment and transmits certificates associated with the installed certificate chain to access the remote data source after the enrollment without presence of the smart card;

to allow a user to determine whether a device is the insecure device to be given temporary credential or the trusted device to be given permanent credential when the smart card is inserted in the device; and when the smart card is lost, to provide a certificate revocation list that is configured to include;

a certificate $[pub_T]_E$ which contains a public key $pub_T$ for the temporary credential signed with a private key $priv_E$ for the permanent credential; and a certificate $[pub_E]_F$ which contains a public key $pub_E$ for the permanent credential signed with a private key $priv_F$ for the temporary credential.

14. The hybrid smart card of claim 13, wherein the smart card is further configured to cause an external confirmation request to be sent to the user, thereby allowing the user to confirm providing of the temporary credential or the permanent credential to the device.

15. The hybrid smart card of claim 14, wherein the external confirmation request is sent to the user via an email or a wireless Short Message System (SMS) message.

16. A system for establishing temporary and permanent credentials for secure data access, the system comprising:
  a home network server residing in a network identified by a network name;
  a temporary smart card configured to provide a temporary credential for a first insecure device, thereby providing the first insecure device with temporary secure access to the home network server when the temporary smart card is used with the first insecure device, wherein the first insecure device loses the temporary secure access to the home network server as soon as the temporary smart card is removed from the first insecure device;
  an enrollment smart card configured to provide a permanent credential for a second trusted device, thereby providing the second trusted device with permanent secure access to the home network server, wherein the second trusted device installs a certificate chain during enrollment and transmits certificates associated with the installed certificate chain to the home network server without presence of the enrollment smart card or the temporary smart card; and
  wherein when the temporary smart card or the enrollment smart card is lost, a certificate revocation list that is configured to include:
  a certificate $[pub_T]_E$ which contains a public key $pub_T$ the temporary smart card signed with a private key $priv_E$ for the enrollment smart card; and
  a certificate $[pub_E]_F$ which contains a public key $pub_E$ for the enrollment smart card signed with a private key $priv_F$ for the temporary smart card.

17. The system of claim 16, wherein the home network server is configured to establish a certificate chain on the temporary smart card and a certificate chain on the enrollment smart card, thereby facilitating secure data access to the home network server.

18. The system of claim 16, wherein while providing the permanent credential for the second trusted device, the enrollment smart card is configured to allow the second trusted device to:
  generate a pair of private key and public key; and
  to obtain necessary certificates for establishing a certificate chain to facilitate secure communications between the second trusted device and the home network server.

19. The system of claim 16, wherein the temporary smart card is configured to grant to the first insecure device temporary access to a wireless network to which the home network server is coupled.

20. The system of claim 16, wherein the enrollment smart card is configured to grant to the second trusted device permanent access to a wireless network to which the home network server is coupled.

21. The system of claim 16, wherein the temporary smart card stores computer instructions which can be automatically executed by the first insecure device to:
  invoke a web browser for temporary secure online shopping; and
  provide temporary access to a wireless network to which the home network server is coupled or temporary secure access to the home network server.

22. The system of claim 16, wherein the enrollment smart card stores computer instructions which can be automatically executed by the second trusted device to:
  invoke a web browser for permanent secure online shopping; and
  provide permanent access to a wireless network to which the home network server is coupled or permanent secure access to the home network server.

23. A method for establishing temporary and permanent credentials for secure remote data access, the method comprising:
  providing a temporary smart card to provide a temporary credential for a first insecure device, thereby providing the first insecure device with temporary secure access to a remote data source when the temporary smart card is used with the first insecure device, wherein the first insecure device loses the temporary secure access as soon as the temporary smart card is removed from the first insecure device;
  providing an enrollment smart card to provide a permanent credential for a second trusted device, thereby providing the second trusted device with permanent secure access to the remote data source, wherein the second trusted device installs a certificate chain during enrollment and transmits certificates associated with the installed certificate chain to access the remote data source after enrollment without presence of the enrollment smart card or the temporary smart card; and
  wherein the temporary smart card or the enrollment smart card is lost, providing a certificate revocation list that is configured to include;
  a certificate $[pub_T]_E$ which contains a public key $pub_T$ for the temporary credential signed with a private key $priv_E$ for the permanent credential; and
  a certificate $[pub_E]_F$ which contains a public key $pub_E$ for the permanent credential signed with a private key $priv_F$ for the temporary credential.

* * * * *